United States Patent Office 3,236,740
Patented Feb. 22, 1966

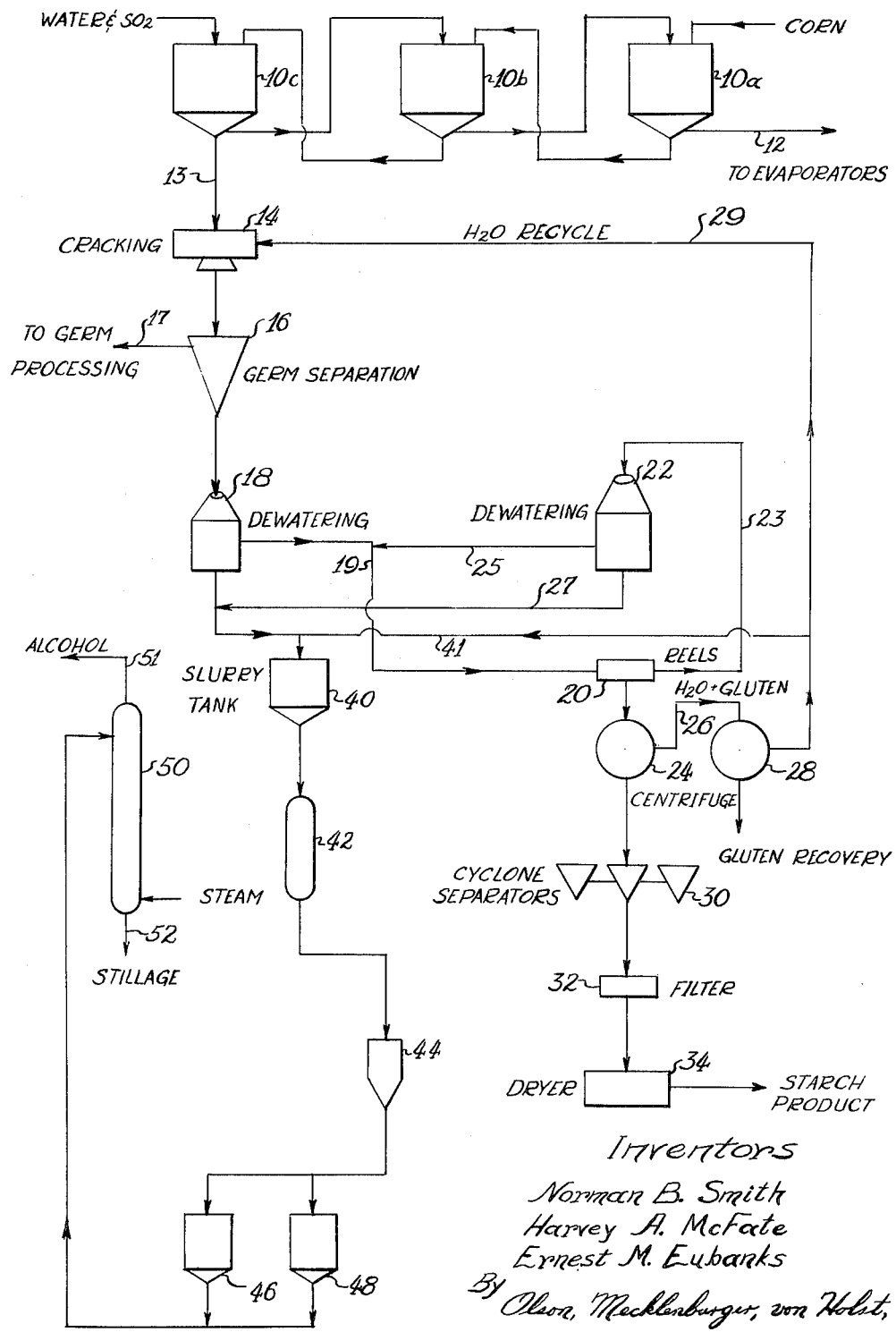

3,236,740
PROCESS FOR PRODUCING STARCH
AND ALCOHOL
Norman B. Smith, Harvey A. McFate, and Ernest M.
Eubanks, Muscatine, Iowa, assignors to Grain Process-
ing Corporation, Muscatine, Iowa, a corporation of
Iowa
Filed May 26, 1961, Ser. No. 112,954
12 Claims. (Cl. 195—32)

This invention relates to a process for the manufacture of starch and alcohol from starch-bearing materials. More particularly, it relates to a novel combined process for the manufacture of starch and ethyl alcohol from cereal grains such as corn, wheat, rice and the like.

Corn and other starch-bearing grain materials are used in the manufacture of starch. For example, corn is steeped in a solution of sulfur dioxide and water. The steep water is collected and concentrated for the recovery of the soluble components, while the steeped and softened corn is then processed by subjecting the kernel to a series of grinding and separation operations. The corn kernel components, namely, the germ, the hull (pericarp), and the endosperm are separated in the process. Individual starch granules imbedded in a proteinaceous matrix (gluten) composes the endosperm. The germ portion of the kernel contains the oil, a valuable by-product of the milling industry. The fiber portion of the kernel is principally the hull which envelops the complete kernel.

To accomplish the separation of the major corn components, the steeped corn is subjected to cracking and the cracked material, in a water slurry, is subjected to a wet germ separation operation. The wet germ separation may involve a flotation operation or a centrifugal hydrocyclone type of separation. The germ as a separate component is further washed and conditioned for removal of the oil. In the conventional wet milling operation, it is necessary further to grind the residue of the grain for efficient separation of the hull and unmilled endosperm. The resultant slurry after grinding must be screened and dewatered. Starch and gluten are separated from the coarse fiber in the first dewatering operation. Subsequent milling and washing of the coarse fiber are usually necessary to insure a fiber stream leaving the system which contains little or no starch residue.

The starch-gluten bearing stream from the coarse fiber separation contains a quantity of fine fiber. The removal of fine fiber usually is accomplished by the use of reels covered with fine nylon or silk bolting cloth or vibrating screens. Subsequent washing of the fine fiber is necessary to avoid starch loss in the fiber stream leaving the process.

The mill starch stream containing starch, gluten, and water is purified and washed in centrifugal separations. Subsequent steps of filtering, washing and drying of the purified starch are necessary to market the starch powder. Gluten from the purification step is concentrated, filtered, and dried as a by-product.

The economies of conventional starch manufacturing processes as outlined above are directly related to the amount of starch present in the fiber stream leaving the process. Substantially complete removal of starch from the coarse fiber is desired. In an attempt to accomplish this it has become necessary in conventional starch manufacturing processes to employ multiple milling and screening steps. Capital investment and operating expenses for such screening and milling operations are high. Moreover, by employing a number of milling operations in order to obtain maximum separation of the starch and gluten from the fiber, it is impossible to avoid increasing the protein and fine fiber content of the starch produced.

A principal object of the present invention is to provide certain improvements in the wet milling of starch.

A further object of the present invention is to reduce the number of screening and milling operations now generally employed in the wet milling of starch.

An additional specific object of the invention is to provide an improved process for recovering a high-purity low protein starch from cracked, degerminated grains.

Another object of the invention is to provide a simplified and economical method of producing a low-protein content starch wherein maximum recovery and utilization of the starch is attained.

Another object of the invention is to provide an economical process for producing a high-purity starch wherein an intermediate product of the starch process is utilized for the production of ethyl alcohol.

A further object of the invention is to provide a combined process for the simultaneous production of starch and ethyl alcohol which process has the decided economic advantages that substantially complete utilization of the starch content of the starch-bearing grain is achieved.

A still further object of the present invention is to provide a starch manufacturing process employing a novel separation procedure for separating starch which avoids the necessity of employing multiple milling and screening operations.

The present invention provides a wet starch manufacturing process which comprises subjecting starch-bearing grain to steeping and cracking and germ removal operations to provide a wet degerminated mass containing the hull and partially milled endosperm. Without any further grinding or milling the wet degerminated stream is then subjected to a dewatering operation to separate an aqueous filtrate containing starch, gluten and fine fiber from the bulk of coarse fiber, grit fragments and hull. The filtrate or aqueous stream containing the starch, guten, and fine fiber then passes into a revolving reel or onto a vibrating screen covered with fine nylon or silk bolting cloth to remove final traces of fine fiber prior to the separation of the starch and gluten. The solids which have been separated from the aqueous filtrate in the dewatering operation are utilized as a mash which is treated in a convertor to form a wort for fermentation. In the convertor the starch content is changed to sugar usable as a yeast food in the fermentation operation. The fermented wort is then subjected to distillation for recovery of alcohol. The separated germ can be recovered and treated to recover valuable by-products therefrom such as corn oil.

The process of the invention will be further illustrated in conjunction with the accompanying drawing, the sole figure of which is a flow sheet illustrating a presently preferred embodiment of the process. A starch-bearing grain material such as corn is supplied to the steeping stages 10a, 10b and 10c. The steeping stages can be in countercurrent relation with liquor drained from 10c being supplied to 10b and liquor from 10b to 10a. As is known to those familiar with steeping operations, rather than to progress the grain undergoing steeping through successive steeping tanks, a batch can be permitted to remain in one steep through the successive steeping stages, by the use of suitable valves and piping. In this manner fresh steep water contacts corn which has been steeped for the longest period while the steep liquor having the highest level of starch content contacts fresh corn. Sulfur dioxide is used in the steeping operation to inhibit microorganism action and to aid in the extraction of the soluble fractions of the corn kernels. The initial concentration of sulfur dioxide in the steeping water ranges from about 0.02% to 0.4% by weight. Steeping of the corn is conducted at a temperature in the range from about 75 to 140° F. and preferably from 120 to 130° F. for a period ranging from about 18 hours to 72 hours or more.

The steep liquor from steep tank 10a is pumped from the system through line 12 and treated to recover solids therefrom. The steeped corn passes via line 13 to cracking or degerminating mill 14.

Various types of coarse mills are suitable for use in the process at this point. The primary object of this milling operation is to crack open the grain and free the germ, preferably without breaking or crushing the latter. Other objects are to loosen the hull and coarsely disintegrate the endosperm. Process water is recycled through line 29 and added to the grain as it is being cracked or disintegrated in order to form a slurry which can be pumped to the germ separator apparatus and in order to adjust the density of the slurry to a value at which the germs will float. This value is about 8 to 10.5° Baumé.

After cracking in mill 14 the resulting magma passes to separator 16 for separation of germ. It is preferred to employ for this operation separating apparatus which employs centrifugal force to effect separation of the wet germ from starch and fibrous material although other types of apparatus such as flotation equipment can be employed. One preferred type of germ separator is manufactured commercially under the trade name "DorrClone." This type of separator comprises a cylindro-conical shell with provisions for introducing feed and withdrawing underflow and overflow. The feed chamber is cylindrical in section and is fitted with a tangential feed pipe. The conical section extends from the feed chamber to the apex valve and the underflow pipe projects from the discharge side of the adjustable apex opening. Centrifugal force created by the entry of the slurry and the conical design of the unit causes a separation, with the low density germ material being discharged out the top of the unit while the starch, gluten, hulls and corn fragments are discharged out the bottom. The separated germ is removed from separator 16 by way of line 17, washed and processed for the recovery of corn oil and other valuable by-products.

The germ free material from the germ separating operation is subjected to a dewatering operation 18. This procedure departs from the conventional practice wherein after separation of the germ, the germ free material is subjected to multiple grinding and milling operations. The elimination of multiple grinding and milling operations at this point provides various advantages and represents a significant improvement over the prior art wet milling processes. The dewatering operation at this stage of the process actually is a separation of starch and fiber inasmuch as a stream of starch, gluten and fine fiber is separated from the bulk of coarse fiber, grit fragments and hull. Various apparatus can be employed for dewatering the degerminated slurry at 18, however it is preferred to employ the type of screening centrifuge manufactured commercially under the trade name the "Mercone Screening Centrifuge." Such screening centrifuges are characterized by the utilization of high centrifugal force to overcome the capillary attraction of liquid to solids. In this screening centrifuge a high centrifugal force is applied along an increasing diameter screen to continuously provide a high capacity separation of the slurry into substantially dry solids and liquid filtrate.

The effectiveness of the dewatering operation at 18 in separating a high-purity starch from the grits, hulls and other undesired components of the grain depends greatly upon the operating conditions. The solids content of the feed stream to the dewatering operation should be maintained in the range of about 15 to 35% by weight. The solids content of the feed stream can be readily controlled by regulation of the amount of process water recycled to the cracking operation. With the preferred screening centrifuge the rate of feed of slurry to the dewetering operation 18 is maintained in the range from about 50 to 135 gallons per minute and preferably from about 100–115 gallons per minute. Higher feed rates result in significantly reduced starch recovery. While lower feed rates may provide a small additional increase in starch recovery they are impractical. The dewatering operation is conducted at a temperature of from 75° to 140° F., preferably from 100–110° F. Higher temperatures are to be avoided since at temperatures appreciably above 140° F. the starch gelatinizes. Screens with hole diameters from 0.003 to 0.062 inch and from 10 to 20% open area are preferably employed in the screening centrifuge.

The liquid filtrate from dewatering operation 18 containing starch, gluten and fine fiber passes through line 19 to reels 20 for removal of the fibers. The reels 20 are of conventional type, constructed of stainless steel and covered with nylon bolting cloth. The reels are inclined at an angle of about 2–8° toward the discharge end and rotated at a rate of about 24 r.p.m. so that the fine fiber moves to the discharge end of the reels while the starch and gluten filter through the nylon bolting. Generally the fine fiber discharge from the nylon reels contains some starch and it is therefore preferred to subject this stream to a second dewatering operation as at 22. The fine fiber discharged from reels 20 is shown being supplied to the second dewatering operation 22 by line 23. The apparatus employed in the second dewatering operation 22 can be the same as that employed in the primary dewatering operation 18 with the exception that a smaller screen size is employed at 22 since the material being screened is smaller in size. A screen having 0.015 inch openings and 22% open area is generally satisfactory for use in the dewatering operation at 22. The starch-containing overflow from dewatering device 22 passes via lines 25 and 19 for recycle to the reels 20, while the underflow containing the separated fiber passes via line 27 to join the underflow from dewatering device 18.

The crude starch product containing some gluten discharged in the underflow from reels 20 can be handled as desired depending upon its intended usage. This crude starch product is generally superior to starch products obtained at corresponding points in prior art starch manufacturing processes. The protein content of the starch produced is generally less than about 4% or 5% as compared with starch prepared by prior art processes containing 8–9% or more protein. The crude starch product is eminently satisfactory for a variety of commercial applications without further purification. However, if desired, the starch-gluten slurry can be treated by conventional procedures for separation and recovery of the starch, with the gluten being separately recovered as a by-product useful in feeds and so forth. Thus, the starch-gluten discharge from reels 20 can be centrifuged at 24 with the overflow comprising water and gluten being sent to a second centrifuge 28 for removal of water. The water overflow from centrifuge 28 can be advantageously recycled through line 29 for further use in the process.

Moreover, the crude starch product after separation of the major proportion of gluten can be further purified by treatment in cyclone separators 30 prior to filtration at 32 and drying at 34. The cyclone separators 30 which are much smaller in size than those employed at 16 for separation of germs, serve to remove gluten, fiber, etc. to provide a starch product of approximately 99.5% purity. After treatment in the cyclone separators 30, the starch is filtered in filter 32 and dried in dryer 34 to a final moisture content of 9–12%.

A major feature of the present invention is that it provides a combined process for the production of high-purity starch and alcohol from starch-bearing grain material. In accordance with this preferred embodiment of the invention the solids discharged from the dewatering operations 18 and 22 are combined in slurry tank 40. These solids comprise for the most part fiber, hulls and grits from which the major proportion of the high-purity starch has been previously removed in the dewatering operations. Process water can be recycled to tank 40 through line 41 to form a pumpable slurry of the solids therein. Since the starch content of these solids is about 40 to 50% of the total content, we have found that these solids possess certain properties well suited to their use in the production of alcohol. These solids are substantially free of corn germs, the germs having been previously separated from the system. The presence of corn germs throughout the alcohol production process is objectionable because it does not increase the yield of alcohol but greatly increases the tendency of the liquor to foam thus making it difficult to handle the liquor in present equipment such as centrifuges. In producing the alcohol according to the present process the solids from slurry tank 40 are subjected to a starch converting operation in converter 42 wherein the starch content is converted to sugar. This operation can be conducted in any convenient manner such as by autoclaving the starch in the presence of a mineral acid such as sulfuric to convert the starch to fermentable sugars. Moreover, as is known to those skilled in the art diastatic enzymes can also be used for this saccharification operation. When a mineral acid is employed in converter 42 the material removed therefrom is preferably neutralized as in tank 44 by the addition of an alkali such as sodium carbonate and the like. The neutralized material from the neutralizer tank 44 is then passed to the batch fermentors 46 and 48 together with yeast and other chemical additives required to permit the material to ferment in the usual manner. From the fermenters 46 and 48 the fermented material is supplied to a distillation column 50 from which the desired alcohol is removed through line 51. The drawoff 52 from distillation column 50 contains yeast and other suspended solids of the stillage and can be sent to evaporators or other equipment for recovery of the solids content.

The process described above has many advantages not possessed by conventional processes. The above process provides a high-purity starch of low protein content by a simplified procedure employing only a single milling operation in contrast to the multiple milling and grinding operations employed in conventional wet milling processes. This, of course, affords significant economy in both equipment and operating expenses. It will be noted also that the described process provides a marketable starch product without the necessity of complicated and expensive purification treatments as is generally required by prior art processes. Of course, as is described above, purification of the starch produced by the process after separation from its gluten content can be carried out if desired in order to produce an exceptionally high-purity starch. Because of the relatively high purity of the crude starch initially the equipment necessary for such optional purification treatment is minimized and high capacity operation achieved.

A further major advantage of the above process is that it provides for the combined manufacture of starch and alcohol in a most simplified and economical manner. In the combined process for the manufacture of starch and alcohol substantially complete utilization of the starch content of cereal grains is achieved. Moreover, by the specified sequence of operation the high-purity starch is separated from a residue comprising other components of the starch-bearing grain, which residue is particularly advantageous for the production of alcohol. The use of this grain residue enables substantially complete utilization of the starch-bearing grain. In the combined process a minimum amount of water is employed with maximum efficiency.

These modifications and equivalents which fall within the spirit of the invention and the scope of the appended claims are to be considered part of the invention.

We claim:
1. A process which comprises steeping a starch-bearing grain material in water; subjecting a water slurry of the steeped material to a cracking operation to disintegrate the grain and free the germ; removing the germ from the resulting cracked magma; subjecting the degerminated magma without further grinding to a dewatering operation to obtain a liquid filtrate containing a good quality starch, gluten and fine fiber and a solid residue containing coarse fiber, hulls and grits; subjecting the liquid filtrate thus obtained to screening for the removal of fine fiber therefrom; treating the solid residue obtained from said dewatering operation to convert the starch content thereof to sugar and thereby form a material for fermentation; fermenting the last named material; and then distilling the fermented material to recover alcohol therefrom.

2. A process which comprises steeping a starch-bearing grain material in water; subjecting a water slurry of the steeped material to a cracking operation to disintegrate the grain and free the germ; removing the germ from the resulting cracked magma; subjecting the degerminated magma without further grinding to a dewatering operation to obtain a liquid filtrate containing a good quality starch, gluten and fine fiber and a solid residue containing coarse fiber, hulls and grits; subjecting the liquid filtrate thus obtained to screening for the removal of fine fiber therefrom; subjecting the fiber-free starch and gluten to centrifugal separation to recover a starch substantially free of gluten; treating the said solid residue obtained from said dewatering operation to convert the starch content thereof to sugar and thereby form a material for fermentation; fermenting the last named material; and then distilling the fermented material to recover alcohol therefrom.

3. The process of claim 2 wherein the said starch-bearing grain material is corn.

4. The process of claim 2 wherein the starch product after separation from its gluten content is further purified by being subjected to centrifugal separation, washing and drying operations.

5. The process of claim 2 wherein the steeping of said starch-bearing grain material is carried out in a plurality of stages with the flow of steep liquor being countercurrent to the flow of starch-bearing grain material.

6. A process which comprises steeping a starch-bearing grain material in water; subjecting a water slurry of the steeped material to a cracking operation to disintegrate the grain and free the germ; removing the germ from the resulting cracked magma; subjecting the degerminated magma without further grinding to a dewatering operation to obtain a liquid filtrate containing a good quality starch, gluten and fine fiber and a slid residue containing coarse fiber, hull and grits; subjecting the liquid filtrate thus obtained to screening for the removal of fine fiber therefrom; subjecting the fiber-free starch and gluten to centrifugal separation to recover a starch substantially free of gluten; subjecting the thus separated gluten stream to a second centrifugal separation to obtain a water overflow and a gluten and fine fiber and a solid residue containing coarse cracking operation to form a slurry of the grain material being cracked; treating the said solid residue obtained from said dewatering operation to convert the starch content thereof to sugar and thereby form a material for fermentation; fermenting the last named material; and then distilling the fermented material to recover alcohol therefrom.

7. A process which comprises steeping a starch-bearing grain material in water; subjecting a water slurry of the steeped material to a cracking operation to disintegrate the grain and free the germ; removing the germ from the resulting cracked magma; subjecting the degerminated magma without further grinding to a dewatering operation to obtain a liquid filtrate containing a good quality starch, gluten and fine fiber and a solid residue containing coarse fiber, hulls and grits; subjecting the liquid filtrate thus obtained to screening for the removal of fine fiber therefrom;

subjecting said fine fiber discharge to a second dewatering operation to obtain a liquid filtrate containing additional starch and a solid residue composed of fine fiber, recycling said last-mentioned liquid filtrate to said screening operation for removal of fine fiber therefrom, commingling said last-mentioned solid residue with the solid residue resulting from said first-mentioned dewatering operation; subjecting the fiber-free starch and gluten to centrifugal separation to recover a starch substantially free of gluten; treating the said solid residue obtained from said dewatering operation to convert the starch content thereof to sugar and thereby form a material for fermentation; fermenting the last named material; and then distilling the fermented material to recover alcohol therefrom.

8. A process which comprises steeping a starch-bearing grain material in water; subjecting a water slurry of the steeped material to a cracking operation to disintegrate the grain and free the germ; removing the germ from the resulting cracked magma; subjecting the degerminated magma without further grinding to a dewatering operation to obtain a liquid filtrate containing a good quality starch, gluten and fine fiber and a solid residue containing coarse fiber, hulls and grits; subjecting the liquid filtrate thus obtained to screening for the removal of fine fiber therefrom; subjecting said fine fiber discharge to a second dewatering operation to obtain a liquid filtrate containing additional starch and a solid residue composed of fine fiber; recycling said last-mentioned liquid filtrate to said screening operation for removal of fine fiber therefrom; commingling said last-mentioned solid residue with the solid residue resulting from said first-mentioned dewatering operation; subjecting the fiber-free starch and gluten to centrifugal separation to recover a starch substantially free of gluten; subjecting the thus-separated gluten stream to a second centrifugal separation to obtain a water overflow and a gluten underflow, recycling said water overflow to said cracking operation to form a slurry of the grain material being cracked; treating the said solid residue obtained from said dewatering operation to convert the starch content thereof to sugar and thereby form a material for fermentation; fermenting the last-named material; and then distilling the fermented material to recover alcohol therefrom.

9. The process of claim 8 wherein the starch-bearing grain material is corn.

10. A process which comprises steeping a starch-bearing grain material in water; subjecting a water slurry of the steeped material to a cracking operation to disintegrate the grain and free the germ; removing the germ from the resulting cracked magma; subjecting the degerminated magma without further grinding to a dewatering operation to obtain a liquid filtrate containing a good quality starch, gluten and fine fiber and a solid residue containing coarse fiber, hulls and grits; subjecting the liquid filtrate thus obtained to screening for the removal of fine fiber therefrom; subjecting the fiber-free starch and gluten to centrifugal separation to recover a starch substantially free of gluten.

11. The process of claim 10 wherein the steeping of the starch-bearing grain material is carried out in a plurality of stages with the flow of steep liquor being countercurrent to the flow of starch-bearing grain material.

12. A process which comprises steeping a starch-bearing grain material in water; subjecting a water slurry of the steeped material to a cracking operation to disintegrate the grain and free the germ; removing the germ from the resulting cracked magma; subjecting the degerminated magma without further grinding to a dewatering operation to obtain a liquid filtrate containing a good quality starch, gluten and fine fiber and a solid residue containing coarse fiber, hulls and grits; treating the solid residue obtained from said dewatering operation to convert the starch content thereof to sugar and thereby form a material for fermentation; fermenting the last named material; and then distilling the fermented material to recover alcohol therefrom.

References Cited by the Examiner

UNITED STATES PATENTS

| | | | |
|---|---|---|---|
| 2,698,826 | 1/1955 | Peltzer | 127—68 |
| 2,724,503 | 11/1955 | Fontein | 127—67 |
| 2,790,718 | 4/1957 | Nugey | 99—51 |
| 3,029,169 | 4/1962 | Dowie et al. | 127—67 |

FOREIGN PATENTS

| | | |
|---|---|---|
| 213,981 | 3/1958 | Australia. |

OTHER REFERENCES

Kerr: "Chemistry and Industry of Starch," 1950, Academic Press, New York, pages 37–47, 56,–58.

MORRIS O. WOLK, *Primary Examiner.*

TOBIAS E. LEVOW, *Examiner.*